(12) United States Patent
Havener et al.

(10) Patent No.: US 8,401,508 B2
(45) Date of Patent: Mar. 19, 2013

(54) METHOD AND APPARATUS FOR MITIGATION OF UNWANTED SIGNAL COMPONENTS IN COMPLEX SAMPLING RECEIVER

(75) Inventors: Dave Havener, Olathe, KS (US); Timothy Gibson, Overland Park, KS (US); Manuel Franklin Richey, Paola, KS (US); Jyotsna Motukupally, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 936 days.

(21) Appl. No.: 12/388,720

(22) Filed: Feb. 19, 2009

(65) Prior Publication Data

US 2010/0210230 A1    Aug. 19, 2010

(51) Int. Cl.
*H04B 1/16* (2006.01)
*H04B 15/00* (2006.01)

(52) U.S. Cl. ............ 455/296; 455/192.1; 455/259

(58) Field of Classification Search ............ 455/192.1, 455/192.2, 255, 257, 259, 323, 324
See application file for complete search history.

(56) References Cited

U.S. PATENT DOCUMENTS

| 4,893,316 | A | 1/1990 | Janc et al. |
| 5,835,038 | A | 11/1998 | Nakao et al. |
| 6,463,266 | B1 * | 10/2002 | Shohara ............ 455/196.1 |
| 7,024,172 | B1 * | 4/2006 | Murphy et al. ............ 455/324 |
| 7,176,817 | B2 | 2/2007 | Jensen |
| 7,389,101 | B2 * | 6/2008 | Diorio et al. ............ 455/323 |
| 2006/0094391 | A1 * | 5/2006 | Darabi ............ 455/323 |

* cited by examiner

*Primary Examiner* — Lincoln Donovan
*Assistant Examiner* — Terry L Englund
(74) *Attorney, Agent, or Firm* — Fogg & Powers LLC

(57) ABSTRACT

Disclosed are methods and systems for mitigating unwanted signal components. A received carrier signal is downconverted using a local reference signal that imposes an frequency perturbation or dither. Later, when an intermediate digitized signal is filtered to remove the DC offset that is an artifact of the sampling process, the dither in the carrier signal serves to distinguish the carrier from the unwanted offset. The preferred offset filter is a low pass filter with a passband that is narrow relative to the frequency range of the dither.

20 Claims, 3 Drawing Sheets

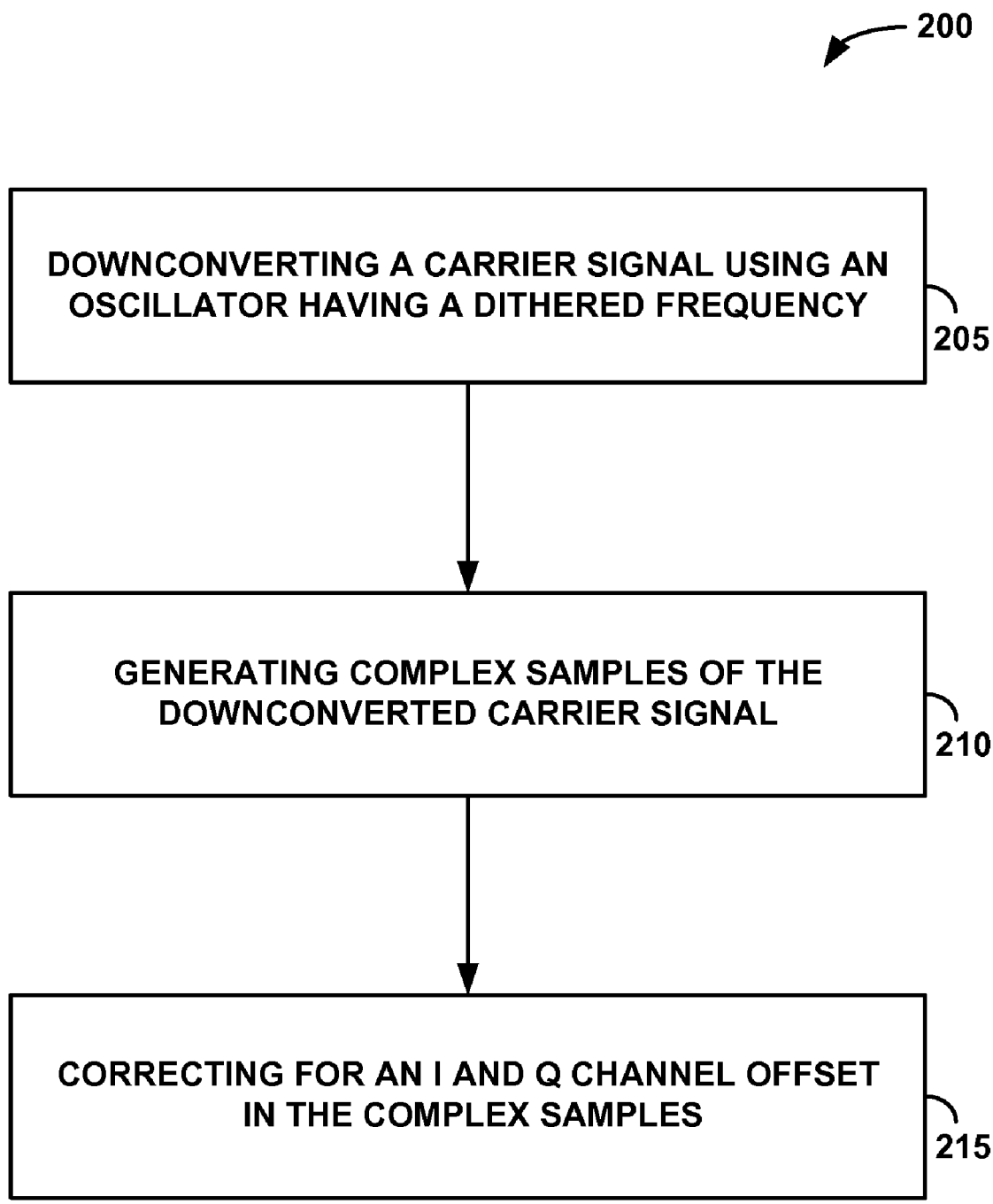

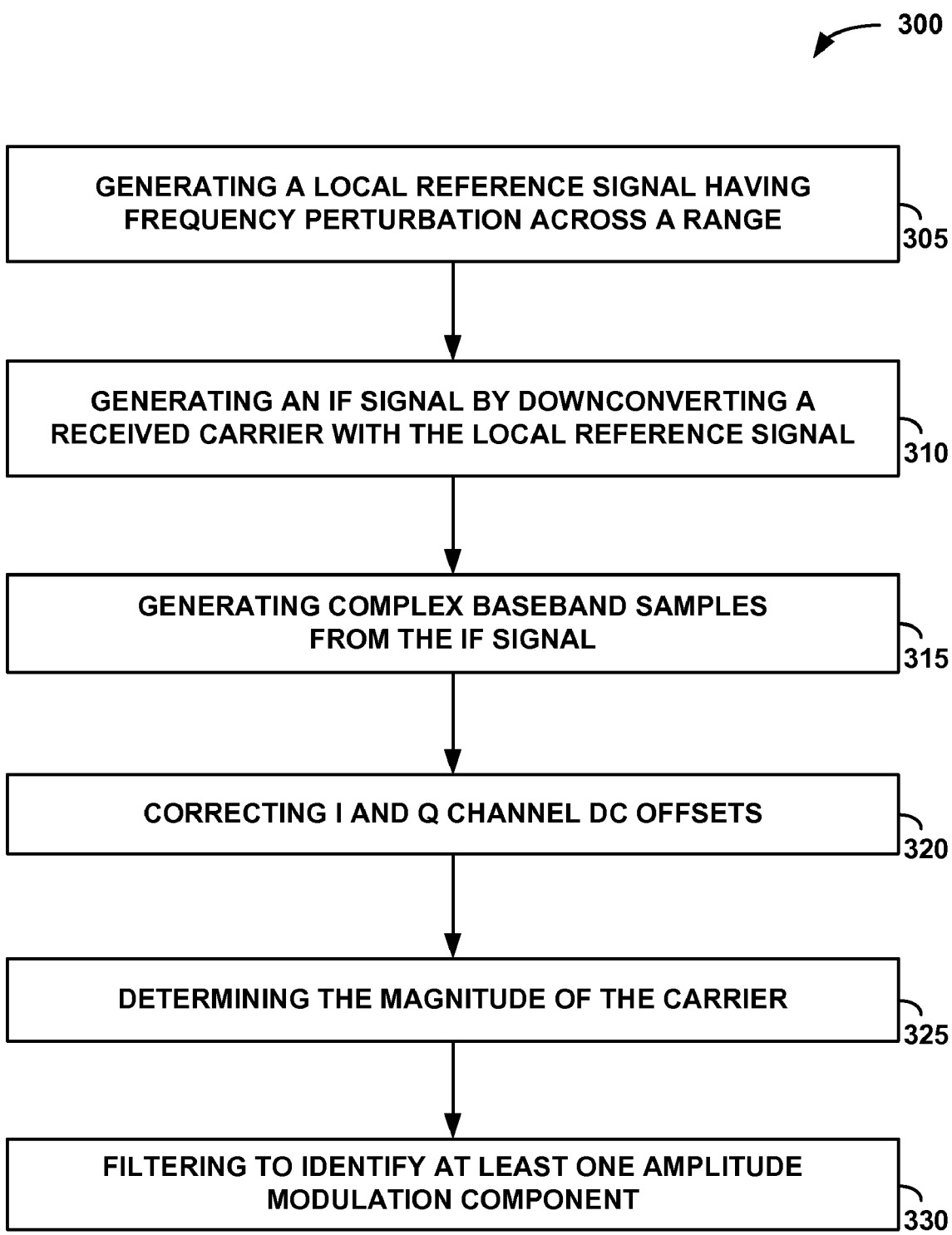

METHOD AND APPARATUS FOR MITIGATION OF UNWANTED SIGNAL COMPONENTS IN COMPLEX SAMPLING RECEIVER

FIELD

The embodiments herein relate to methods and systems for mitigating unwanted signal components, particularly those that may appear in the processing of a received amplitude modulated (AM) radio frequency (RF) carrier signal.

BACKGROUND

Aircraft may be equipped to receive radio frequency (RF) signals that carry navigational information. For example, an aircraft may receive an analog instrument landing system (ILS) signal composed of a 110.1 MHz carrier signal having two tone amplitude modulation (AM) side bands at 90 Hz and 150 Hz. These analog radio frequency signals are typically shifted down in frequency and converted into digital signals by a sampling device to be processed by the navigational system aboard the aircraft. During the frequency conversion and analog to digital conversion processes, an unwanted frequency offset and DC amplitude offset can be introduced into the I (In-phase) and Q (Quadrature) channels of the signal as an artifact of that conversion. Should the frequency of the converted carrier signal fall near baseband, the frequency offset, together with the I and Q channel DC offset, may distort the magnitude of the information signal, making it appear as amplitude modulation.

SUMMARY

In exemplary embodiments, methods and systems for mitigating unwanted signal components are disclosed. A received carrier signal is downconverted using a local reference signal that imposes a frequency perturbation or dither. Later, when the intermediate digitized signal is filtered to remove the DC offset that is an artifact of the sampling process, the dither in the carrier signal serves to distinguish the carrier from the unwanted offset.

In one embodiment, a method for mitigating unwanted signal components is disclosed. A carrier signal is downconverted using an oscillator that has a dithered frequency. Complex samples are then generated from the downconverted carrier signal. The complex samples may have I and Q channel offsets, and offset filters calculate the I and Q channel DC offset values, allowing for the correction of the I and Q channel DC offset. The dithered frequency prevents the offset filters from altering the magnitude of the carrier signal.

In another embodiment, a method for detecting amplitude modulation components is disclosed. A local reference signal, having a frequency perturbation across a range, is generated. A received carrier (which is typically modulated with an information signal) is then downconverted with the local reference signal to generate an IF signal. Complex baseband samples are generated from the IF signal. Because the frequency perturbation imposes a dynamically varying frequency difference between the reference and the carrier, I and Q channel offsets may be detected and corrected. Next, the magnitude of the carrier is determined. Finally, at least one amplitude modulation component is identified by filtering.

In yet another embodiment, a receiver apparatus is disclosed. The apparatus comprises a local reference generator, a mixer, an analog-to-digital converter, an I and Q channel offset correction block, and a local oscillator control signal generator. The local reference generator generates a local reference signal that the mixer uses to downconvert a modulated carrier to a desired frequency band. The analog-to-digital converter then generates I and Q channel samples of the downconverted modulated carrier. The I and Q channel offset correction block has a predetermined response bandwidth and corrects the I and Q channel samples. The local oscillator control signal generator varies the local reference generator so as to controllably shift the carrier substantially outside the predetermined response bandwidth.

In some embodiments, the dither is an intentional frequency perturbation bound by a frequency range. Further, in other embodiments, the offset filters comprise at least one low pass filter with a passband that is narrow relative to the range of the dither.

In yet other embodiments, the output of the offset filters is averaged over an interval to determine the I and Q channel DC offset values. In these embodiments, the dithered frequency prevents the offset filters from altering the magnitude of the carrier signal because the carrier signal is swept in and out of the passband of the offset filters so as not to substantially affect the I and Q channel DC offset values. In other words, without a frequency offset between the carrier and the local reference, the carrier itself is inadvertently detected and converted to a DC offset by the at least one narrow band low pass filter, substantially distorting the I and Q channel DC offsets. Further, correcting I and Q channel DC offsets may involve subtracting the average I and Q channel DC offsets from the complex baseband samples to generate corrected complex baseband samples.

These as well as other features and advantages will become apparent to those of ordinary skill in the art by reading the following detailed description, with appropriate reference to the accompanying drawings.

BRIEF DESCRIPTION OF THE DRAWINGS

FIG. 2 is a flow diagram illustrating a method for mitigating unwanted signal components, according to another embodiment of the invention.

FIG. 3 is a flow diagram illustrating a method for mitigating unwanted signal components, according to yet another embodiment of the invention.

DETAILED DESCRIPTION OF THE DRAWINGS

Figure 1:
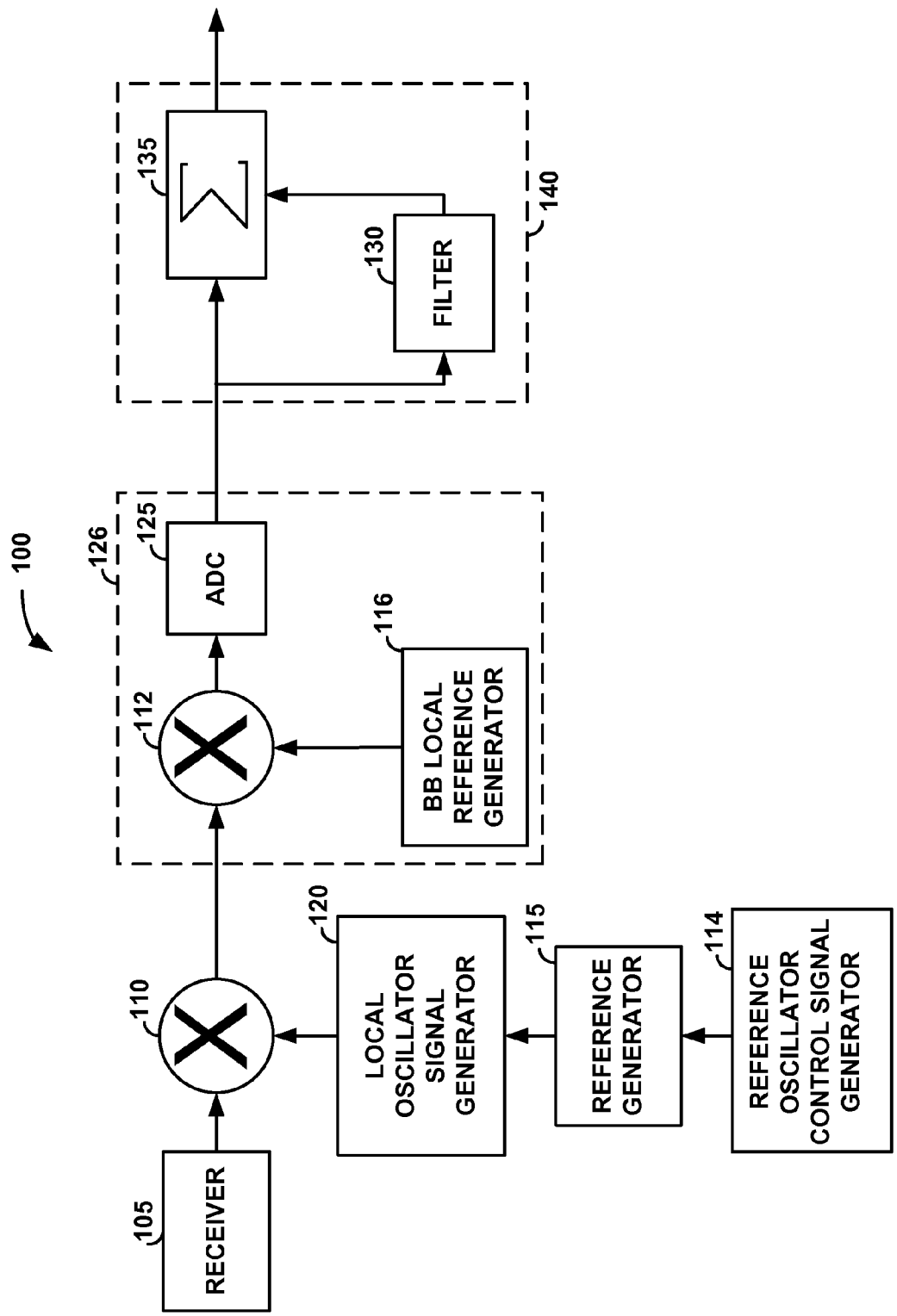
FIG. 1 is a block diagram illustrating a system for mitigating unwanted signal components, according to an embodiment of the invention.

FIG. 1 is a block diagram illustrating a system 100 for mitigating unwanted signal components. System 100 comprises a receiver 105 connected to an intermediate frequency (IF) mixer 110, a baseband mixer 112, which is in turn connected to an analog-to-digital converter (ADC) 125, which is in turn connected to both a filter block 130 and a summing block 135. Filter block 130 is also connected to summing block 135, and together filter block 130 and summing block 135 comprise an offset correction block 140. A local oscillator signal generator 120 is connected to IF mixer 110, a reference generator 115 is connected to local oscillator signal generator 120, and a reference oscillator control signal generator 114 is connected to reference generator 115. A baseband local reference generator 116 is connected to baseband mixer 112.

Receiver 105 receives signals such as analog amplitude modulated (AM) RF carrier signals. Receiver 105 may be situated on an aircraft and attuned to receive signals indicative of the aircraft's position. Receiver 105 may have a response bandwidth that is 30 kHz wide, which would accommodate both a ground station and an aircraft being off of their target frequencies. Receiver 105 may be implemented using any appropriate combination of analog circuit components. For example, receiver 105 may include tuning and amplification sub-circuits.

Mixer 110 receives a carrier signal from receiver 105 and a local reference signal from local oscillator signal generator 120. Mixer 110 downconverts the carrier signal, using the local reference signal, to create an IF signal. The IF is the difference between the incoming RF frequency and the local oscillaor signal generator frequency. Mixer 110 may be implemented using any appropriate combination of analog circuit components.

Reference oscillator control signal generator 114 transmits a control signal to reference generator 115. Reference oscillator control signal generator 114 may be implemented in a digital signal processing unit or in other appropriate software, hardware, or circuitry, and the local oscillator control signal is preferably a digital signal. The local oscillator control signal may therefore pass through one or more levels of digital-to-analog conversion before being received by local reference generator 115.

Reference generator 115, preferably an oscillator that is voltage controlled or otherwise controllable, generates a reference signal used to adjust the local oscillator signal. For instance, the reference oscillator control signal could be a table look-up or a triangle or ramp wave signal with a frequency on the order of 2 Hz. Thus, in one embodiment, a processor may execute program code stored in a memory device (e.g., RAM) to read values stored in a table (also RAM, or a dedicated buffer) and provide them to a digital-to-analog converter (DAC) to generate the analog control signal voltage. Other embodiments utilize a counter whose output is fed into a DAC to generate the control signal. Alternatives include an analog circuit, such as a relaxation oscillator including a charging capacitor, for generating an analog ramp voltage. The variation of the local oscillator control signal controllably shifts the carrier signal by imposing a frequency perturbation, or dither, in the local reference signal. (The dither may also be referred to as jitter.) This controllable shift does not disturb the amplitude modulation components of the carrier signal. Because the carrier signal is downconverted using the local oscillator signal, the IF signal displays the dither imposed upon the local oscillator signal according to the reference generator control signal. In one embodiment, the dither range of the local oscillator signal, and therefore of the IF signal, is plus or minus 22 Hz.

The baseband mixer 112 converts the received signal from an IF frequency range to a baseband signal using baseband local reference generator 116. ADC 125 receives the baseband signal from mixer 112 and converts it from an analog signal to a digital signal. Further, ADC 125 generates complex samples from the baseband signal. In one embodiment, this is accomplished by resolving the received signals into inphase (I) and quadrature (Q) components by the mixer 112 and local reference generator 116 being configured appropriately (e.g., using sine and cosine reference signals from generator 116, and separate I and Q mixers within mixer 112). ADC 125 may be a flash converter, a successive-approximation converter, a ramp-compare converter, a delta-encoded converter, a pipeline converter, a Sigma-Delta converter, or any other appropriate analog-to-digital converter. ADC 125 may also be paired with mixer 112 and baseband local reference generator 116 to accomplish the mixing or downconversion along with the analog-to-digital conversion into a single circuit 126.

In an alternative embodiment, the dither frequency offset may be injected in the IF-to-baseband conversion step. In this embodiment, the IF local reference generator is simply used to tune to the correct RF channel without any dither, while the oscillator control signal from generator 120 is provided to local oscillator 116.

Complex I (In-phase) and Q (Quadrature) DC channel offsets may be added into the signal as artifacts of the conversion process. Should these DC offsets remain in the baseband signal, the magnitude of the carrier signal may be distorted. In particular, a frequency offset may cause the received signal to rotate in the IQ plane, which, when combined with a DC offset, may appear as an amplitude modulation of the carrier; therefore, before the magnitude of the carrier signal or its amplitude modulation components may be determined, the DC offsets must be corrected.

Offset correction block 140 exists to determine the I and Q channel DC offset values and to correct the signal. A block could be a digital circuit or portion of an ASIC, but in one embodiment is code running on a processor. The embodiment of offset correction block 140 shown in FIG. 1 comprises filter 130 and summing block 135. The complex samples generated by ADC 125 are transmitted to both filter 130 and summing block 135. Filter 130 differentiates the offsets from the other, meaningful components of the signal. Preferably, filter 130 is a relatively narrow band low pass filter. The relatively narrow passband is the predetermined response bandwidth of filter 130. This predetermined response bandwidth may be on the order of 16 mHz (i.e., millihertz), compared with, for example, a peak dither range, imposed by mixer 110 or local reference generator 115, on the order of 20 Hz.

Filter 130 may be an infinite impulse response (IIR) or finite impulse response (FIR) filter or bank of filters and may be implemented using any combination of appropriate digital circuit components. Though only one level of filtering is shown in FIG. 1, any number of levels of filters may be used to isolate the offset artifact. Further, the filter may take the form of two separate filtering operations wherein the I offset component may be filtered and processed separately from the Q offset component.

Summing block 135 generates a corrected signal comprising a sequence of the complex samples less the offset components. In a preferred embodiment, summing block 135 receives the output of filter 130, which corresponds to the magnitude of the offset values, and averages that output over a relatively long period of time—for instance, an average could be taken over a minute and applied to the signal for the minute following, before another average is calculated. Alternatively, the offset calculation could be a sliding average over the prior minute.

The averaging in summing block 135 minimizes any impact that the carrier signal may have on filter 130. For instance, by selecting a passband for filter 130 that is narrow relative to the range of the frequency perturbation imposed by the downconversion at mixer 110, this embodiment ensures that the information signal is of varying frequency and does not stay within the passband of the filter 130 for very long; the offsets, however, remain relatively fixed at DC. Therefore, the IF signal may only briefly exist within the narrow passband of filter 130. Because the output of filter 130 is averaged over time, the impact of the carrier signal on the offset calculation is negligible. When summing block 135 subtracts the average of the output of filter 130 from the complex samples received from ADC 125, the magnitude of the carrier signal and its amplitude modulation components remains intact in the complex digital signals, and the offset is corrected.

This relationship ensures that, even should the frequency of the carrier signal be close to the ideal center of the baseband signal, the carrier signal will not be diluted by the offset artifact. Therefore, the output signal from summing block 135 may be analyzed for amplitude modulation components that contain information. For instance, the output could be analyzed by an aircraft's navigation unit to determine the position of an aircraft, or its location relative to a target.

FIG. 2 is flow diagram illustrating a method 200 for mitigating unwanted signal components, according to another embodiment of the invention. At step 205, a received carrier signal is downconverted using an oscillator having a dithered frequency. In a preferred embodiment, the received carrier signal contains amplitude modulation components. This frequency dither may be an intentional frequency perturbation in the oscillator signal bound by a frequency range. The dither may be present in an RF-to-IF conversion, or in an IF-to-baseband conversion.

At step 210, complex samples of the downconverted carrier signal are generated. An analog-to-digital conversion process may be used to generate these complex samples. At step 215, an I and Q channel offset—an unwanted product of the conversion at step 205 or sampling at step 210—is corrected for. In a preferred embodiment, offset filters calculate the I and Q channel DC offset values. Further, the dithered frequency differentiates the carrier signal from the DC offset signal, and therefore, the existence of the dither prevents the offset filters from altering the magnitude of the carrier signal.

The offset filters may be low pass filters with a narrow passband, or predetermined response bandwidth. This predetermined response bandwidth may be narrow relative to the frequency range of the dithered frequency, so as to lessen the likelihood that the carrier signal will be swept into the response bandwidth for any significant period of time. The output from the offset filters may be averaged over an interval to determine I and Q channel offset values. As artifacts of a conversion or sampling process, these offset values typically do not change significantly over time. Further, even if the dithered carrier signal briefly exists within the passband of the offset filters, the averaged output from the filters will cause any effect of the carrier signal on the offset value calculation to be negligible. The offset filters may comprise any implementation of very narrow band DC-blocking filters that allow all signal components through except the DC offset and may be implemented without the filter output being averaged over an interval.

FIG. 3 is a flow diagram illustrating a method 300 for detecting amplitude modulation components, according to yet another embodiment of the invention. At step 305, a local reference signal having frequency perturbation across a range is generated. Preferably, the frequency perturbation is an intentional perturbation bound by a predetermined frequency range, and the frequency perturbation does not disturb the amplitude modulation components of the carrier signal. A digital control signal may be used to vary the frequency of a local oscillator, which in turn generates the local reference signal.

A received carrier is downconverted, at step 310, with the local reference signal to generate an IF signal. Complex baseband samples are generated from the IF signal at step 315. Step 315 may involve an analog-to-digital conversion and additional downconversion of the IF signal, and the conversion may introduce I and Q channel DC offsets into the signal.

At step 320, I and Q channel offsets, created during the sampling step, are corrected. At least one low pass digital filter with a narrow passband, relative to the range of frequency perturbation, may be used to calculate the value of the I and Q channel DC offsets, which may then be subtracted off of the complex baseband samples. Further, the output of these digital filters may be averaged over an interval before being used to calculate I and Q channel DC offset values. A frequency difference between the offset and the carrier, corresponding to the frequency perturbation, may result in the carrier being predominantly filtered out by the offset filters and not substantially affecting the average I and Q channel DC offset values. The signals resulting from this correction step may be corrected complex baseband samples.

Using the corrected signal at step 325, the magnitude of the carrier is determined. This may be accomplished by determining the magnitude of the corrected baseband samples.

Finally, at step 330, the signal is filtered to identify at least one amplitude component. The filtering may be tuned to the particular frequencies of modulation. For example, an ILS signal having modulation components at 90 Hz and 150 Hz may pass through two levels of filters, one to isolate the 90 Hz amplitude modulation component and the other to isolate the 150 Hz component. The respective magnitudes of the isolated components may then be determined. A comparison between the respective magnitudes may indicate navigational information to the aircraft: for instance, the two magnitudes being substantially equal may indicate that the aircraft is on course, whereas a discrepancy between the two magnitudes may indicate that the aircraft has veered from its expected flight path.

Any one or more of the functions, methods, or steps, described herein may be accomplished by a processor executing code stored in a tangible and computer readable media such as magnetic disks, optical disks, electrical memory, organic memory, and any other volatile (e.g., Random Access Memory ("RAM")) or non-volatile (e.g., Read-Only Memory ("ROM") a hard disk, etc.,) mass storage system. Examples of the functions that may be so accomplished are the generation of oscillator control or dither signals, the determination fo DC offset values for the I and Q channels, and the correction or removal of I and Q channel DC offsets.

It should be understood, however, that this and other arrangements and processes described herein are set forth for purposes of example only, and other arrangements and elements (e.g., machines, interfaces, functions, and orders of elements) can be added or used instead and some elements may be omitted altogether. Further, as in most circuits, those skilled in the art will appreciate that many of the elements described herein are functional entities that may be implemented as discrete components or in conjunction with other components, in any suitable combination and location. For example, an exemplary system may include multiple levels of analog-to-digital conversion, filtering, mixing, tuning, conversion, and digital signal processing, not shown in the Figures.

What is claimed is:
1. A method comprising:
    downconverting a carrier signal using an oscillator having a dithered frequency, wherein the frequency of the oscillator is dithered in an open-loop configuration;
    generating complex samples of the downconverted carrier signal; and
    correcting for an I and Q channel DC offset in the complex samples by calculating I and Q channel DC offset values with offset filters, wherein the dithered frequency prevents the offset filters from altering the magnitude of the carrier signal.

2. The method of claim 1, wherein the dithered frequency comprises an intentional perturbation bound by a frequency range.

3. The method of claim 2, wherein the offset filters comprise low pass filters with a narrow pass band relative to the frequency range.

4. The method of claim 3, wherein output from the offset filters is averaged over an interval to determine the I and Q channel DC offset values and wherein the dithered frequency prevents the offset filters from altering the magnitude of the carrier signal because the carrier signal is swept in and out of the pass band of the offset filters so as not to substantially affect the I and Q channel DC offset values.

5. The method of claim 1, wherein the generating complex signals comprises an analog to digital conversion and wherein the I and Q channel DC offset is an effect of the conversion.

6. The method of claim 1, wherein the carrier signal contains amplitude modulation components.

7. A method of detecting amplitude modulation components, comprising:
generating a local reference signal having a frequency perturbation across a range, wherein the local reference signal is dithered in frequency without feedback control;
generating an IF signal by downconverting a received carrier with the local reference signal;
generating complex baseband samples from the IF signal;
correcting I and Q channel DC offsets, wherein the frequency perturbation imposes a dynamically varying frequency difference between the local reference signal and the carrier;
determining a magnitude of the carrier and,
filtering to identify at least one amplitude modulation component.

8. The method of claim 7, wherein the generating complex baseband samples from the IF signal comprises an analog to digital conversion that includes I and Q channel DC offsets.

9. The method of claim 7, wherein the correcting I and Q channel DC offsets comprises filtering the complex baseband samples through at least one low pass digital filter with a narrow passband relative to the range of the frequency perturbation.

10. The method of claim 9, wherein an output of the at least one low pass digital filter is averaged over an interval to calculate average I and Q channel DC offsets and wherein the correcting I and Q channel DC offsets further comprises subtracting the average I and Q channel DC offsets from the complex baseband samples to generate corrected complex baseband samples.

11. The method of claim 10, wherein the determining the magnitude of the carrier comprises determining the magnitude of the corrected complex baseband signals.

12. The method of claim 10, wherein the frequency difference between the offset and the carrier comprises a variation in frequency of the carrier such that the carrier is predominantly filtered out by the at least one narrow band low pass filter over the interval and thus does not substantially affect the average I and Q channel DC offsets.

13. The method of claim 7, wherein the frequency perturbation does not disturb the at least one amplitude modulation component.

14. The method of claim 7, wherein the generating the local reference signal having the frequency perturbation comprises using a digital control signal to vary the frequency of a local oscillator.

15. A receiver apparatus comprising:
a local reference generator to generate a local reference signal;
a mixer for downconverting a modulated carrier by the local reference signal to a desired frequency band;
an analog-to-digital converter to generate I and Q channel samples of the downconverted modulated carrier;
an I and Q channel DC offset correction block to correct the I and Q channel samples, wherein the I and Q channel DC offset correction block has a predetermined response bandwidth; and
an oscillator control signal generator, coupled in an open-loop configuration, to vary the local reference generator so as to controllably shift the carrier substantially outside the predetermined response bandwidth.

16. The apparatus of claim 15, wherein the local reference generator comprises a local oscillator.

17. The apparatus of claim 15, wherein the modulated carrier comprises at least one modulation component and wherein the controllable shift of the carrier outside the predetermined response bandwidth does not disturb the at least one modulation component.

18. The apparatus of claim 15, wherein the desired frequency band comprises an intermediate frequency.

19. The apparatus of claim 15, wherein the I and Q channel DC offset correction block comprises
a narrow pass digital filter for determining I and Q channel DC offsets; and
a summing block for averaging the I and Q channel DC offsets over an interval and for subtracting the averaged I and Q channel DC offsets off of the I and Q channel samples to generate corrected I and Q channel samples.

20. The apparatus of claim 19, wherein the variation of the local reference generator ensures that the carrier does not remain within the pass band of the narrow pass digital filter of the I and Q channel DC offset correction block.

* * * * *